Jan. 3, 1950 J. MINERVA ET AL 2,493,306
RAPID COFFEE MAKER
Filed March 19, 1946
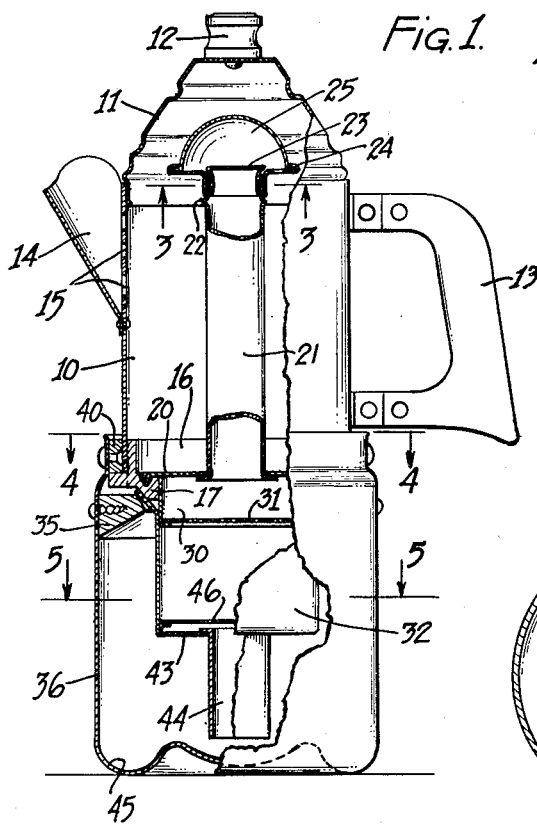
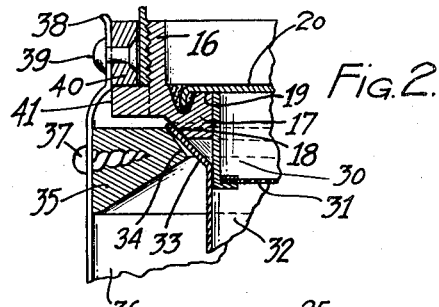
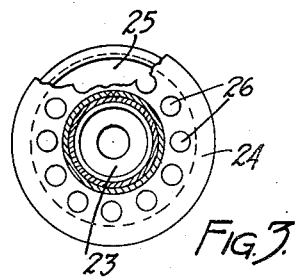
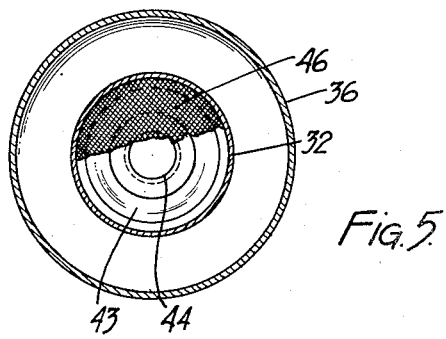
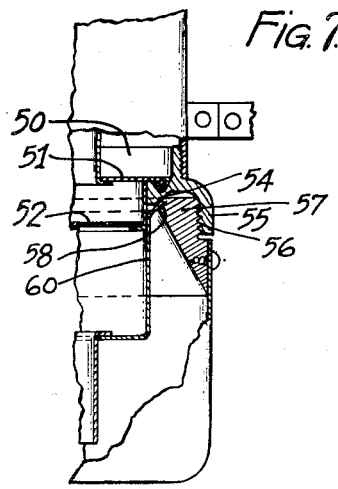
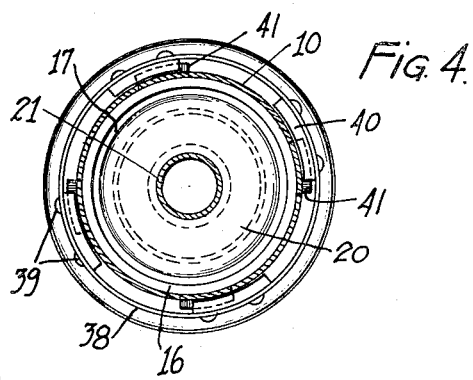
INVENTOR.
JOHN MINERVA &
MICHAEL LOPEZ
BY

Patented Jan. 3, 1950

UNITED STATES PATENT OFFICE 2,493,306

RAPID COFFEE MAKER

John Minerva and Michael Lopez, Brooklyn, N. Y., assignors to Pressure Coffee Maker's Corporation, New York, N. Y., a corporation of New York Application March 19, 1946, Serial No. 655,502

1 Claim. (Cl. 99—303)

This invention relates to coffee making devices and in particular to a pot in which the brew may be made quickly and properly.

A particular object of the invention is to provide a coffee pot of such structure that the water will pass through the coffee but once and thoroughly brew therefrom all of the essentials that contribute to the full flavor of the coffee without extracting the objectionable oils that produce the rancid flavor detrimental to a good cup of coffee.

Further objects of the invention include the construction of a pot in which the steam is sealed so that it will exert pressure to force the coffee into the dispensing portion of the device in such a manner that the coffee can not return through the coffee grounds, but will be ready for pouring, to provide a pot structure of novel form in which the heat from the steam within the lower portion of the device will keep the brewed coffee hot until poured; to prevent boiling of the coffee even should the pot be left over a flame; and to provide a pot structure that will quickly make coffee with full strength and one which can be used by anyone without coffee making experience.

With these and other objects in view, the invention comprises certain constructions hereinafter described and then particularly pointed out in the claims and a preferred embodiment of our invention is illustrated in the accompanying drawings, in which:

Figure 1 is a view in elevation of a coffee pot constructed in accordance with our invention, parts thereof being broken away to show the interior construction thereof, Figure 2 is an enlarged fragmentary section showing the means for joining the parts of the device together, Figure 3 is a section on the line 3—3 of Figure 1, Figure 4 is a section on the line 4—4 of Figure 1, Figure 5 is a section on the line 5—5 of Figure 1, Figure 6 is a fragmentary section showing a detail of the locking means employed in joining the parts of the device together, and Figure 7 is a side view of a part of the pot shown partly in section and illustrating a modification of the structure.

Referring to the drawings in detail 10 indicates the cylindrical body of a pot, closed at the upper end by a cap 11, having a finger knob 12 attached thereto, and carrying at one side a handle 13 diametrically opposite a pouring spout 14 in register with pour holes 15 in the wall of the pot.

The lower edge of the body 10 is secured in any suitable manner to the outer periphery of an upper ring 16 having a depending flange 17, bevelled as at 18, and shouldered as at 19 to provide a support for the bottom plate 20 which is soldered or otherwise secured therein to provide a leakproof joint. The plate 20 is provided with a concentric opening in which is secured by a leakproof joint the lower end of an upper tube 21, whose upper end is provided with an annular ridge 22 for supporting a cap 23 having an opening therein, and a perforated ring 24. The ring has fixed thereto in a rolled edge thereof, the dome 25 so that as the coffee comes up through the tube 21 it will pass through the cap 23 and spill through the perforations 26 in the ring 24. The entire area of the pot body 10 with the exception of the space occupied by the tube 21 holds coffee that has been brewed, and once the coffee has entered the pot body it cannot return to the tube 21. Hence the coffee can pass through the ground bean of the coffee only once.

The depending flange 17 of ring 16 carries a tray 30, the bottom of which is closed by a screen 31 or perforated plate, the tray providing a closure for a coffee basket 32 of cylindrical shape whose upper flared edge 33 is supported on the bevelled inner edge 34 of a lower ring 35 which is secured to the outer wall of the boiler 36 or bottom of the pot, as by the screws 37. The upper edge of the boiler 36 is formed to provide a collar 38 to which is attached as by the screws or rivets 39 annularly spaced lock strips 40 beneath which, spaced lugs 41 formed integrally with upper ring 16, engage to securely lock the upper and lower parts of the coffee pot together and to render the same steam tight by frictionally contacting the bevelled surfaces of the upper and lower rings with the opposite sides of the flared rim of the edge 33 of basket 32.

In a central opening in the bottom 43 of basket 32 a depending tube 44 is secured and extends to a point adjacent the bottom 45 of the water boiler 36, which bottom is preferably corrugated to increase the heat area, the upper end of the tube underlying a screen 46 which holds the coffee, placed in the basket 32 before the body 10 is positioned on the bottom or boiler 36. If desired, the bottoms of the lock strips 40 and the upper edges of the lugs 41 may be slightly tapered to provide a quick locking and jamming means for securing the parts of the pot together.

In a modified form of connecting structure shown in Figure 7 the upper ring 50, which carries the bottom 51 and tray 52 and which is bevelled as at 54, is formed to provide a depending flange 55 which is threaded on its inner periphery as at 56 to received the threaded upper edge of the lower ring 57. The inner belevelled edge 58 of the lower ring coacts with the bevel 54 to frictionally seal the basket 60 in place, the threaded joint 56 permitting rapid attachment and separation of the upper and lower parts of the pot together.

It is evident that the dome 25 forms a small chamber at the upper end of the upper tube 21 and diverts the coffee coming up the tube down through the holes in the ring 24. The steam that has been generated in the top of the boiler or lower portion of the pot forces the water up through the lower tube 44, through the coffee in the basket, through upper tube 21 and into the coffee receptacle or top of the pot where it is kept hot by the steam in the lower boiler which cannot escape.

Our invention is not to be restricted to the precise details of construction shown since various changes and modifications may be made therein without departing from the scope of the invention or sacrificing the advantages derived from its use.

What we claim is:

A coffee making device for the rapid brewing of coffee comprising an upper receptacle for brewed coffee, a plate closing the bottom thereof and having a concentric opening therein, a tube mounted in said plate opening and extending axially of the receptacle to a point near the top thereof, a dome over the upper end of said tube for deflecting brewed coffee from the tube into said receptacle, an upper ring secured to the lower edge of said receptacle and presenting a depending bevelled flange providing a shoulder with such said plate is connected in leak-proof relation and annularly spaced lugs presenting bevelled portions, a boiler having an open upper end for receiving the lower end of said receptacle, a lower ring secured to the inner wall of the boiler adjacent the upper end thereof and presenting an inner bevelled edge, a coffee basket having an upper outwardly flared edge adapted to be supported on the bevelled edge of said lower ring, and be held thereon by contact of the bevelled flange of said upper ring therewith, annularly spaced lock strips having bevelled under faces, fixed on the inner wall of said boiler in spaced vertical relation with said lower ring and adapted to forcibly engage said lugs when the upper receptacle and the boiler are assembled with a relative turning movement to clamp the flared edge of said basket between said upper and lower rings to provide a steam tight joint, coffee screens in said basket and a water inlet tube depending from the bottom of said basket to a point adjacent the bottom of said boiler.

JOHN MINERVA.
MICHAEL LOPEZ.

REFERENCES CITED

The following references are of record in the file of this patent:

UNITED STATES PATENTS

| Number | Name | Date |
|---|---|---|
| 129,882 | Behringer | July 30, 1872 |
| 1,035,099 | Paone | Aug. 6, 1912 |
| 1,171,022 | Ciletti | Feb. 8, 1916 |

FOREIGN PATENTS

| Number | Country | Date |
|---|---|---|
| 309,250 | Italy | July 30, 1933 |
| 712,049 | France | July 13, 1931 |
| 839,466 | France | Jan. 4, 1939 |